(12) United States Patent
Lo et al.

(10) Patent No.: US 8,548,086 B2
(45) Date of Patent: Oct. 1, 2013

(54) MULTIPLE RECEIVERS IN AN OFDM/OFDMA COMMUNICATION SYSTEM

(75) Inventors: Titus Lo, Bellevue, WA (US); Xiaodong Li, Bellevue, WA (US)

(73) Assignee: Neocific, Inc., Bellevue, WA (US)

( * ) Notice: Subject to any disclaimer, the term of this patent is extended or adjusted under 35 U.S.C. 154(b) by 0 days.

(21) Appl. No.: 13/408,908

(22) Filed: Feb. 29, 2012

(65) Prior Publication Data

US 2013/0202019 A1    Aug. 8, 2013

Related U.S. Application Data

(60) Provisional application No. 61/595,565, filed on Feb. 6, 2012.

(51) Int. Cl.
   *H04B 7/02*    (2006.01)
(52) U.S. Cl.
   USPC .......... 375/267; 375/260; 375/299; 375/340; 375/347; 455/101; 455/132; 455/500; 455/562.1; 370/334; 370/464; 341/173

(58) Field of Classification Search
   USPC ......... 375/260, 267, 299, 340, 347; 455/101, 455/132, 500, 562.1; 370/334, 464; 341/173
   See application file for complete search history.

(56) References Cited

U.S. PATENT DOCUMENTS

2009/0219882 A1*  9/2009  Kim et al. ............... 370/330
2009/0232125 A1*  9/2009  Kim et al. ............... 370/350

\* cited by examiner

*Primary Examiner* — Leon Flores
(74) *Attorney, Agent, or Firm* — Woodcock Washburn, LLP

(57) ABSTRACT

A signal receiver is configured to receive multiple time-domain input signals. A plurality of the input signals among the multiple time-domain input signals is selected and transformed into frequency-domain signals. The frequency-domain signals is shifted in phase by a negative value of a respective reference phase, and the phase-shifted signals is combined into one signal. The combined signal is then multiplied with a stored signal to generate a signal product and transformed into a time-domain signal.

16 Claims, 19 Drawing Sheets

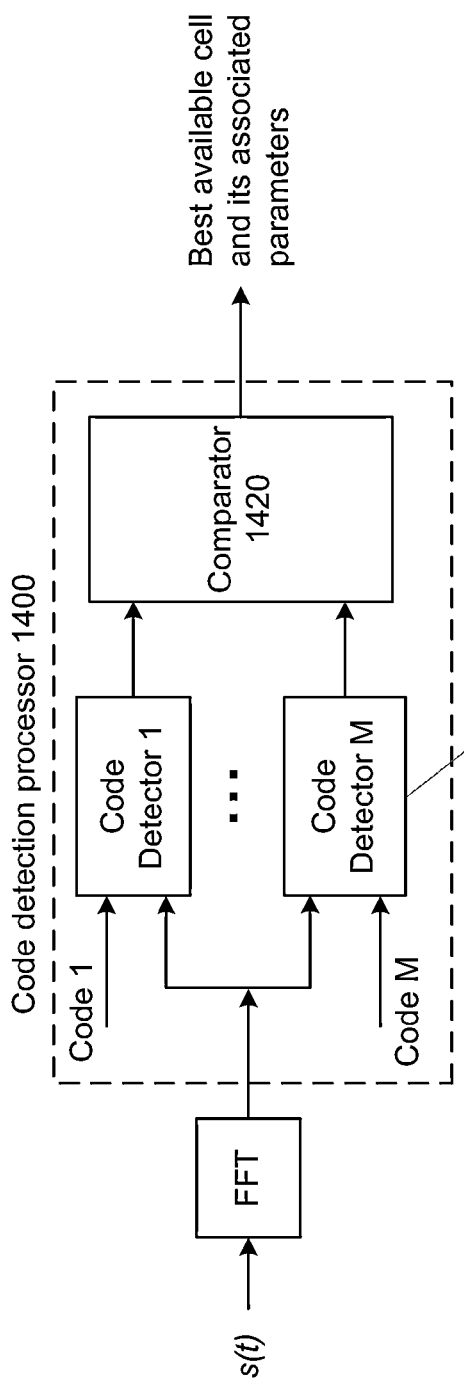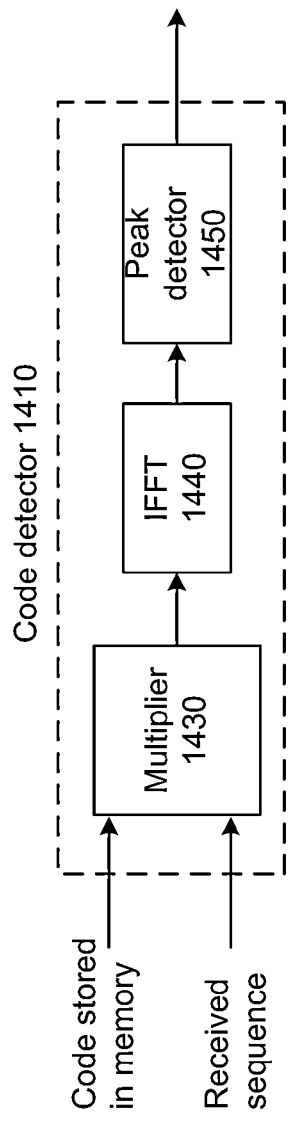

MULTIPLE RECEIVERS IN AN OFDM/OFDMA COMMUNICATION SYSTEM

CROSS REFERENCE TO RELATED APPLICATIONS

This application claims benefit under 35 U.S.C. §119(e) of Provisional U.S. Patent Application No. 61/595,565, filed Feb. 6, 2012, the contents of which is incorporated herein by reference in its entirety.

TECHNICAL FIELD

The disclosed embodiments relate, in general, to (Orthogonal Frequency-Division Multiplexing) OFDM/(Orthogonal Frequency-Division Multiple Access) OFDMA communication system and to time-domain and frequency-domain processing with multiple receivers in an OFDM/OFDMA communication system.

BACKGROUND

In a wireless network, in order to enter the network a mobile station normally has first to acquire signals, search for a suitable base station and then perform a random access to establish communication with that base station. The process of acquiring signals involves signal detection and time and frequency synchronization. The search process, called cell-search, is based on the special signals transmitted by the base stations, such as preambles. Once a suitable base station is found, the random access takes place, which typically includes two steps: (1) ranging and (2) resource request and allocation. During ranging, the mobile station sends a special signal to the base station so that the base station can identify the mobile station with certain associated parameters. During resource request and allocation, the uplink (UL) and downlink (DL) resources for communication are requested and allocated.

In a multi-carrier communication system, such as an Orthogonal Frequency Division Multiplex (OFDM) system, the signal in the time domain is generally organized into frames and each frame may consist of multiple OFDM symbols that carry the information. In order to acquire the multi-carrier signals correctly, the receiver is normally required to find the beginning of a frame. In an Orthogonal Frequency Division Multiple Access (OFDMA) network, both cell-search and ranging processes are critical parts of the protocol. In the cell-search process, a mobile station has to detect the special signal (e.g., the preamble) broadcast by a particular base station, whereas in the ranging process, a base station has to detect the ranging signal sent by a mobile station.

In the case of multiple antennas/receivers, the appropriate use of the multiple received signals can significantly benefit receiver functions such as frame synchronization, cell-search, ranging processes, and frequency offset estimation.

SUMMARY

In accordance with various embodiments of the present invention, a signal receiver may be configured to receive multiple time-domain input signals. A plurality of the input signals among the multiple time-domain input signals may be selected and transformed into frequency-domain signals. The frequency-domain signals may be shifted in phase by a negative value of a respective reference phase, and the phase-shifted signals may be combined into one signal. The combined signal may be multiplied with a stored signal to generate a signal product and transformed into a time-domain signal.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The present invention will be thoroughly understood from the detailed description given below and from the accompanying drawings of various embodiments of the invention, which, however, should not be taken to limit the invention to the specific embodiments, but are for explanation and understanding only.

FIG. 14 is a block diagram of the code detection processor.

FIG. 15 is a block diagram of the code detector.

DETAILED DESCRIPTION OF ILLUSTRATIVE EMBODIMENTS

Figure 1:
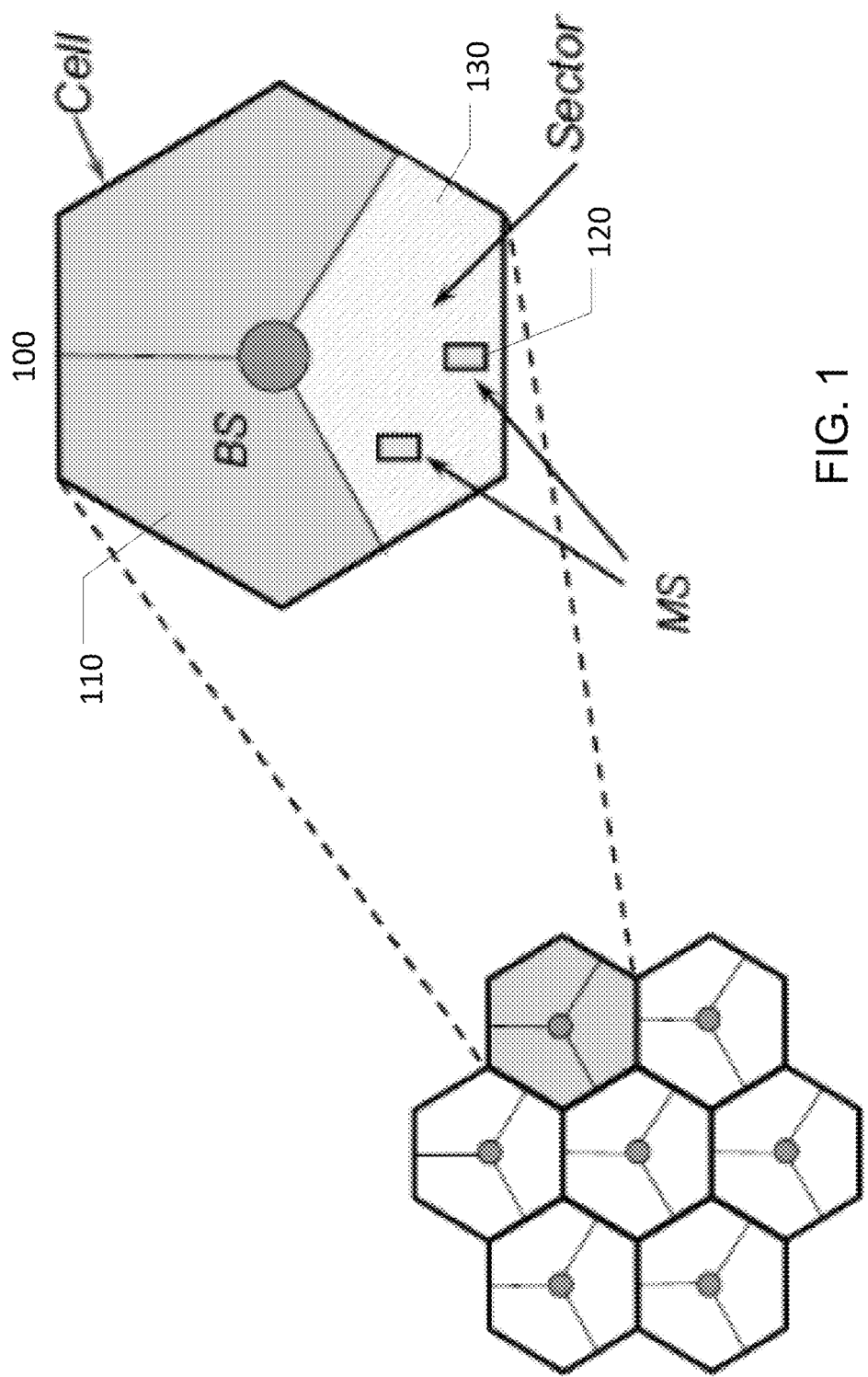
FIG. 1 illustrates the coverage of a wireless communication network that is comprised of a plurality of cells.

Methods and apparatus for multiple-receivers in an OFDMA communication system are disclosed. Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

In some embodiments, frame synchronization may be carried out by recognizing that the specific envelope pattern of the downlink subframe transmitted by a base station exhibits certain characteristics associated with the preamble and the subframe length. The frame detection processor may consist of an envelope detector and differentiator, and a frame detection algorithm. The detection algorithm may be configured to determine the frame starting time by searching for the distinct characteristics in the pattern. In the joint-detection method, the detection algorithm takes into account the detection cost functions to determine the frame starting time.

In some embodiments, frame detection with multiple receivers can be carried out using methods of selection, combining, or joint detection. In the selection method, the selection can be based on certain signal measures such as RSSI, average power, correlation coefficient, and/or SNR, which are input to the selector as side information. In the combining method, the available envelopes are combined, with or without weighting, for detection. The weights are related to certain signal measures such as RSSI, average power, correlation coefficient, and/or SNR, which are input to the combiner as side information.

In some embodiments, the code detection is carried out in the frequency domain, where the signal is transformed to the frequency domain before being input to the code detection processor. The processor may include a set of code detectors and a comparator. Each code detector may include a sequence multiplier, inverse FFT (IFFT), and a peak detector. A code detector with circular shifters may be used to deal with signal with relatively large frequency errors.

In some embodiments, code detection with multiple receivers can be carried out based on selection or combining. The selection of a signal is based on certain signal measures such as RSSI, average power, correlation coefficient, and/or SNR. Signal combining can be carried out in a number of ways. For example, the subcarriers from different receivers may be combined in amplitude and the phase of the combined signal may be assigned to the phase value of the signal with the strongest signal measure. The subcarriers can also be combined after their phases are adjusted with respect to the corresponding reference phases. Weighted combining can also be applied and the weights are associated with certain signal measures, such as SNR.

The following discussion contemplates the application of the disclosed technology to a multi-carrier system, such as Orthogonal Frequency Division Multiplexing (OFDM), Orthogonal Frequency Division Multiple Access (OFDMA), or Multi-Carrier Code Division Multiple Access (MC-CDMA). The invention can be applied to either Time Division Duplexing (TDD) or Frequency Division Duplexing (FDD). Without loss of generality, OFDMA is therefore only used as an example to illustrate the present technology.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Cellular Wireless Networks

FIG. 1 is a representative diagram of a wireless communication network that services a geographic region. The geographic region is divided into a plurality of cells 100, and wireless coverage is provided in each cell by a base station (BS) 110. One or more mobile devices (MS) 120 may be fixed or may roam within the geographic region covered by the network. The mobile devices are used as an interface between users and the network. Each base station is connected to the backbone of the network, usually by a dedicated link. A base station serves as a focal point to transmit information to and receive information from the mobile devices within the cell that it serves by radio signals. Note that if a cell is divided into sectors 130, from a system engineering point of view each sector can be considered as a cell. In this context, the terms "cell" and "sector" are interchangeable.

Figure 2:
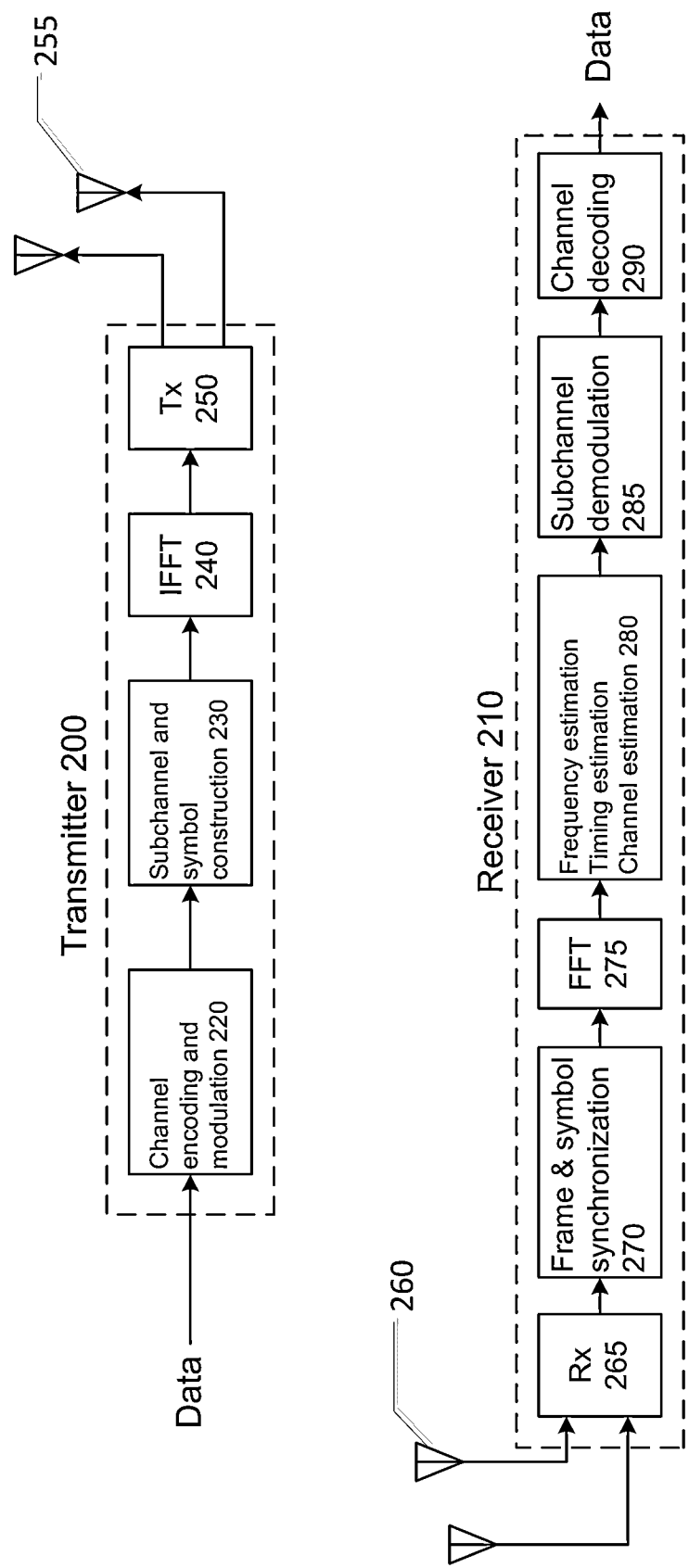
FIG. 2 is a block diagram of a receiver and a transmitter, such as might be used in a multi-carrier wireless communication network.

In a wireless communication system with base stations and mobile devices, the transmission from a base station to a mobile device is called a downlink (DL) and the transmission from a mobile device to a base station is called an uplink (UL). FIG. 2 is a block diagram of a representative transmitter 200 and receiver 210 that may be used in base stations and mobile devices to implement a wireless communication link. The transmitter comprises a channel encoding and modulation component 220, which applies data bit randomization, forward error correction (FEC) encoding, interleaving, and modulation to an input data signal. The channel encoding and modulation component is coupled to a subchannel and symbol construction component 230, an inverse fast Fourier transform (IFFT) component 240, a radio transmitter component 250, and an antenna 255. Those skilled in the art will appreciate that these components construct and transmit a communication signal containing the data that is input to the transmitter. Other forms of transmitters may, of course, be used depending on the requirements of the communication network.

The receiver 210 comprises an antenna 260, a reception component 265, a frame and symbol synchronization component 270, a fast Fourier transform component 275, a frequency timing, and channel estimation component 280, a subchannel demodulation component 285, and a channel decoding component 290. The channel decoding component de-interleaves, decodes, and derandomizes a signal that is received by the receiver. The receiver recovers data from the signal and outputs the data for use by the mobile device or base station. Other forms of receivers may, of course, be used depending on the requirements of the communication network.

Figure 3:
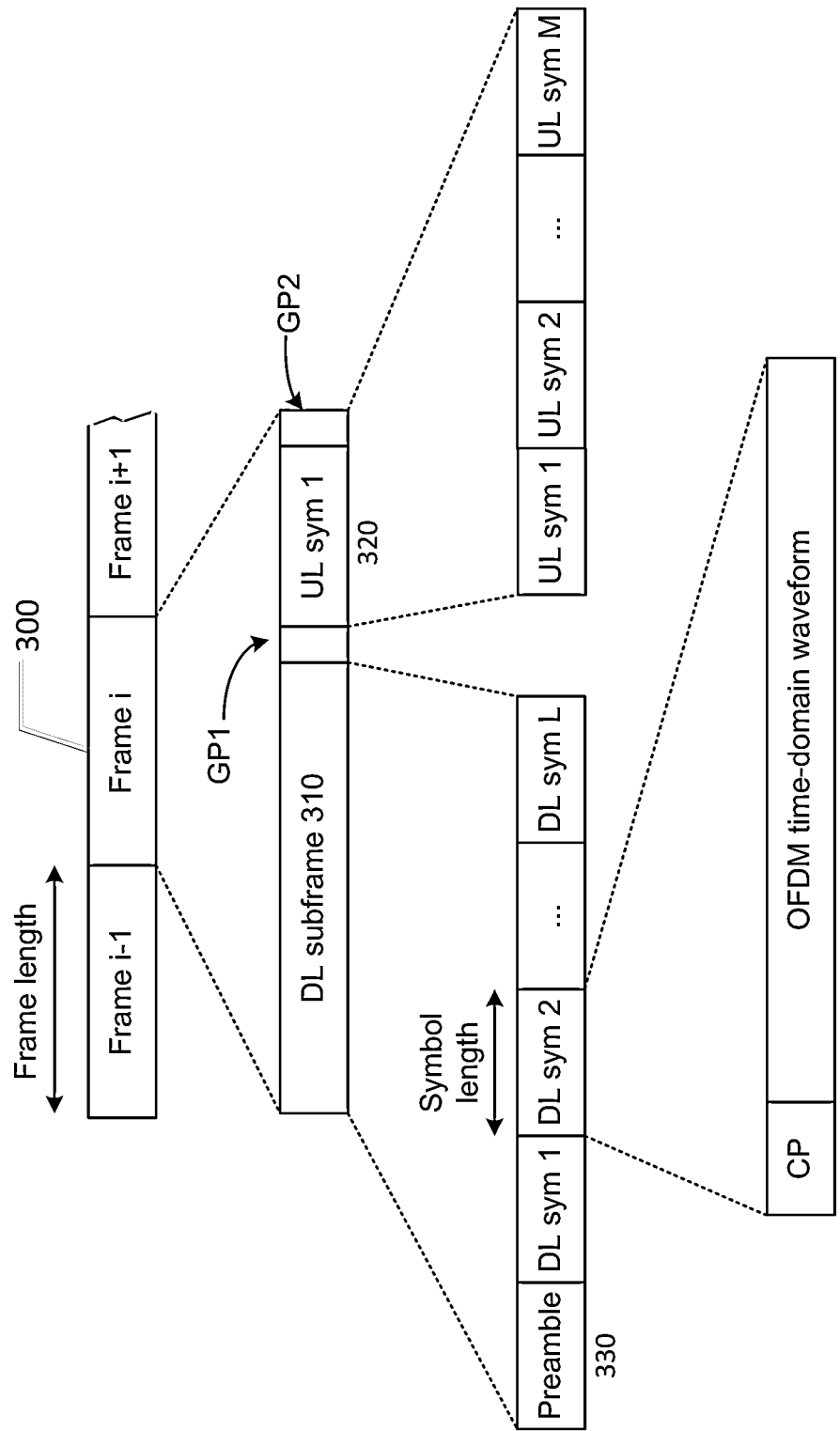
FIG. 3 is a graphical depiction of a multi-carrier signal structure in the time domain.

FIG. 3 depicts the basic structure of an OFDM signal in the time domain, which is generally made up of time frames, subframes, and OFDM symbols. A frame 300 may consist of a DL subframe 310 and a UL subframe 320. In the case of TDD, a guard period (GP1) is inserted after the DL subframe 310 and another guard period (GP2) is inserted after the UL subframe 320 to account for the time needed to turn on and off transmitters and receivers, as well as radio propagation delay. A subframe may be comprised of one or more OFDM symbols. The OFDM time domain waveform is generated by applying an inverse-fast-Fourier-transform (IFFT) to the OFDM signals in the frequency domain. A copy of the last portion of the time waveform, known as the cyclic prefix (CP), is inserted in the beginning of the waveform itself to form the OFDM symbol.

Figure 4:
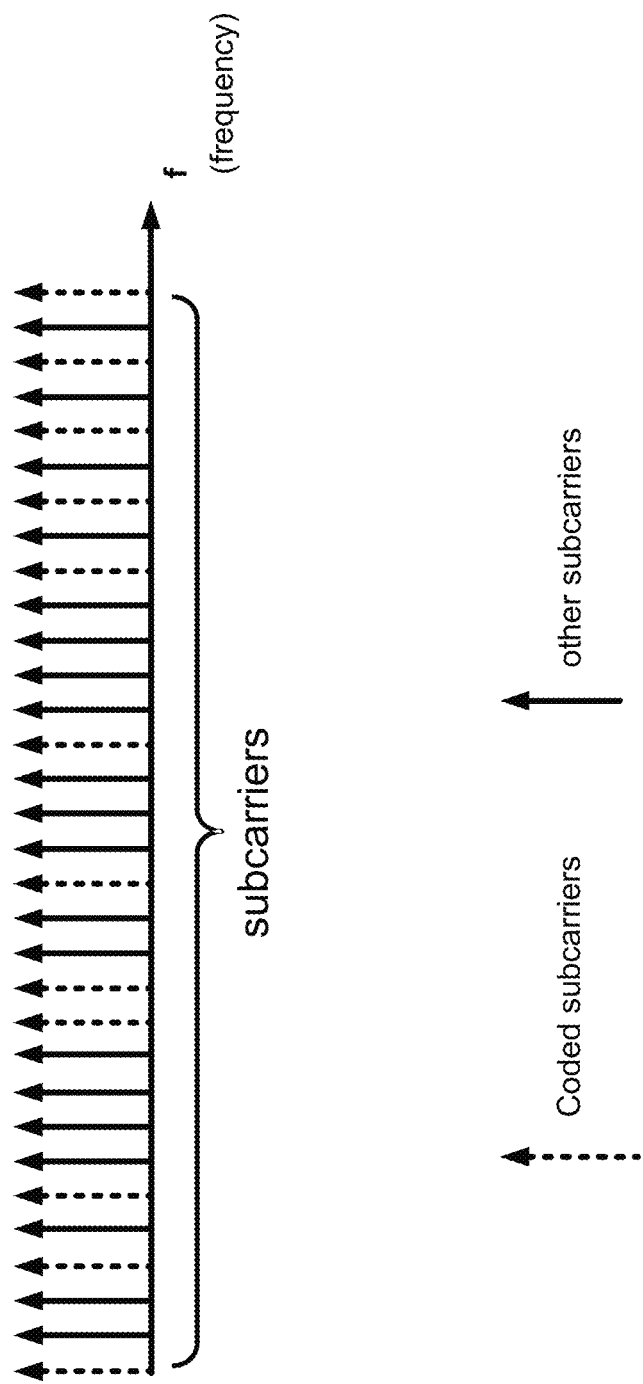
FIG. 4 is a graphical depiction of coded subcarriers.

The preamble 330 is transmitted by the base station during DL subframe and the ranging signal is transmitted by a mobile station during UL subframe. In both cases, the signal consists of L subcarriers (e.g., shown in FIG. 4) that can are modulated by a code sequence in the frequency domain. The code sequence can be either binary or non-binary. In some cases, the preamble 330 may consist of multiple identical segments to facilitate functions such as frequency offset estimation.

Frame Detection

Figure 5:
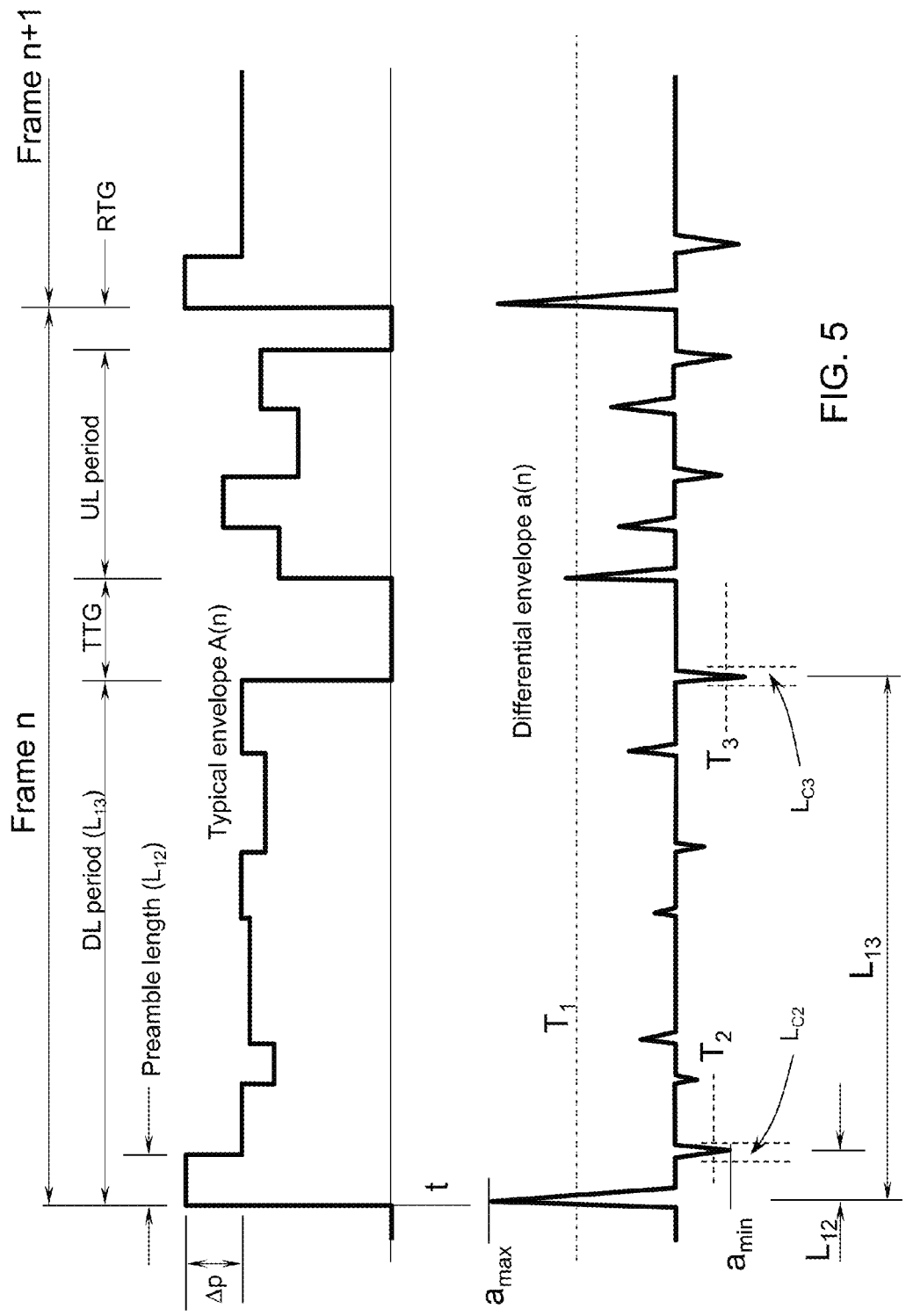
FIG. 5 is a graphical depiction of a typical power envelope of a frame and its corresponding differential envelope.

The first symbol of the DL subframe is often designated to the preamble, which may be used to facilitate performance of frequency synchronization, cell-search, and other radio functions by the MS. A frame may possess a set of distinctive characteristics such as the preamble, the subframe lengths, and the guard-period durations, which can be exploited for frame synchronization. For example, in the IEEE802.16e standard, the DL subframe transmitted by the BS exhibits a certain energy envelope pattern that can be used for frame synchronization, as shown in FIG. 5. The average power of the preamble is higher than the maximum power of the rest of the DL OFDM symbols by Δp. These DL OFDM symbols have a minimum power level because a set of pilot subcarriers are transmitted in each symbol whether this symbol carries data or not. The duration of the preamble is $L_{12}$ and the duration of the DL subframe is $L_{13}$.

A simple way to find the beginning of the frame is to detect the power surge due to the preamble. However, the receiver may sometimes detect a power surge in the UL period, thereby resulting in false detection. A more sophisticated method is to detect the power plunge both at the end of the preamble and at the end of the DL subframe, in addition to the power surge at the beginning of the preamble.

To detect the surge or plunge of power in the envelope, a differential operation may be applied to the envelope, resulting in peaks and dips corresponding surges and plunges, respectively, as illustrated in FIG. 5. If the envelope is represented by A(n), the differential function of the envelope, called the differential envelope, is given by $$a(n) = A(n) - A(n-1)$$

To reduce the effect of noise, the average is often used; that is, $$\bar{a}(n) = \sum_{j=1}^{M} A(n+j) - \sum_{k=1}^{M} A(n-k)$$

where M is the window length for the integration. It should be noted that A(n) can be in linear or logarithmic scale. In one embodiment, the integration window length is set to equal to the length of the receive transition gap (RTG) or transmit transition gap (TTG).

Figure 6:
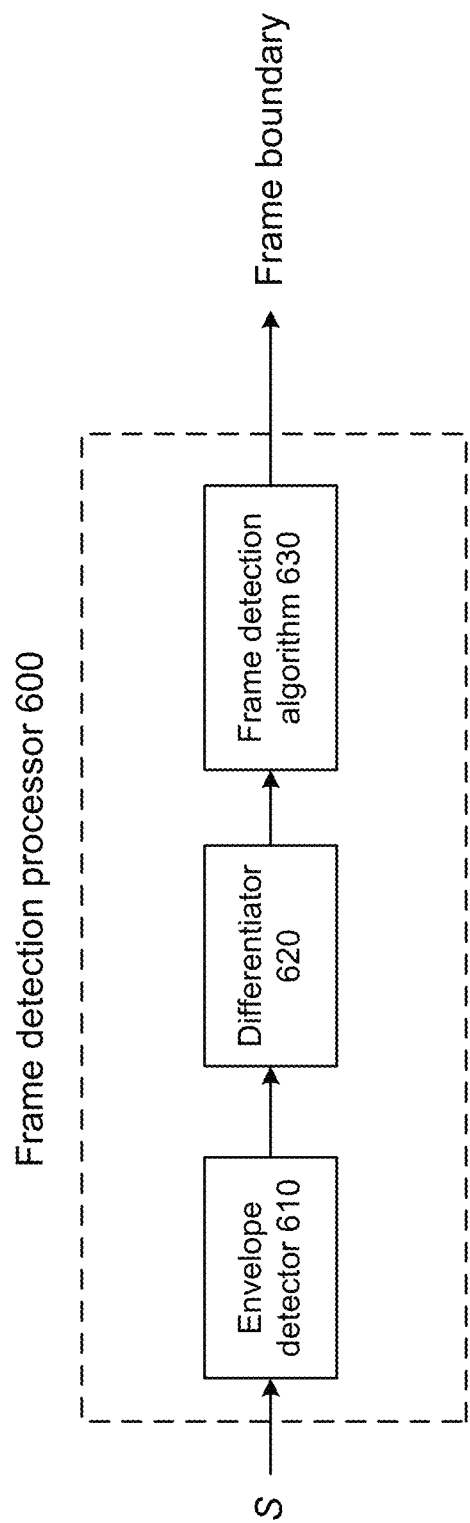
FIG. 6 is a block diagram of the frame detection processor.

Frame synchronization may be carried out by a frame detection processor 600, which comprises an envelope detector 610, differentiator 620, and frame detection algorithm 630, as shown in FIG. 6. The detection algorithm 630 is configured to determine the frame starting time $t_{frame}$ by searching for the peaks and dips at the right time location in the differential envelope. The detection probability for $t_{frame}$ is a function of the thresholds $(T_1, T_2, T_3)$ and the confidence intervals $(L_{C2}, L_{C3})$ (see FIG. 5); that is, $$p_d = f(T_1, T_2, T_3, L_{C2}, L_{C3})$$

Figure 7:
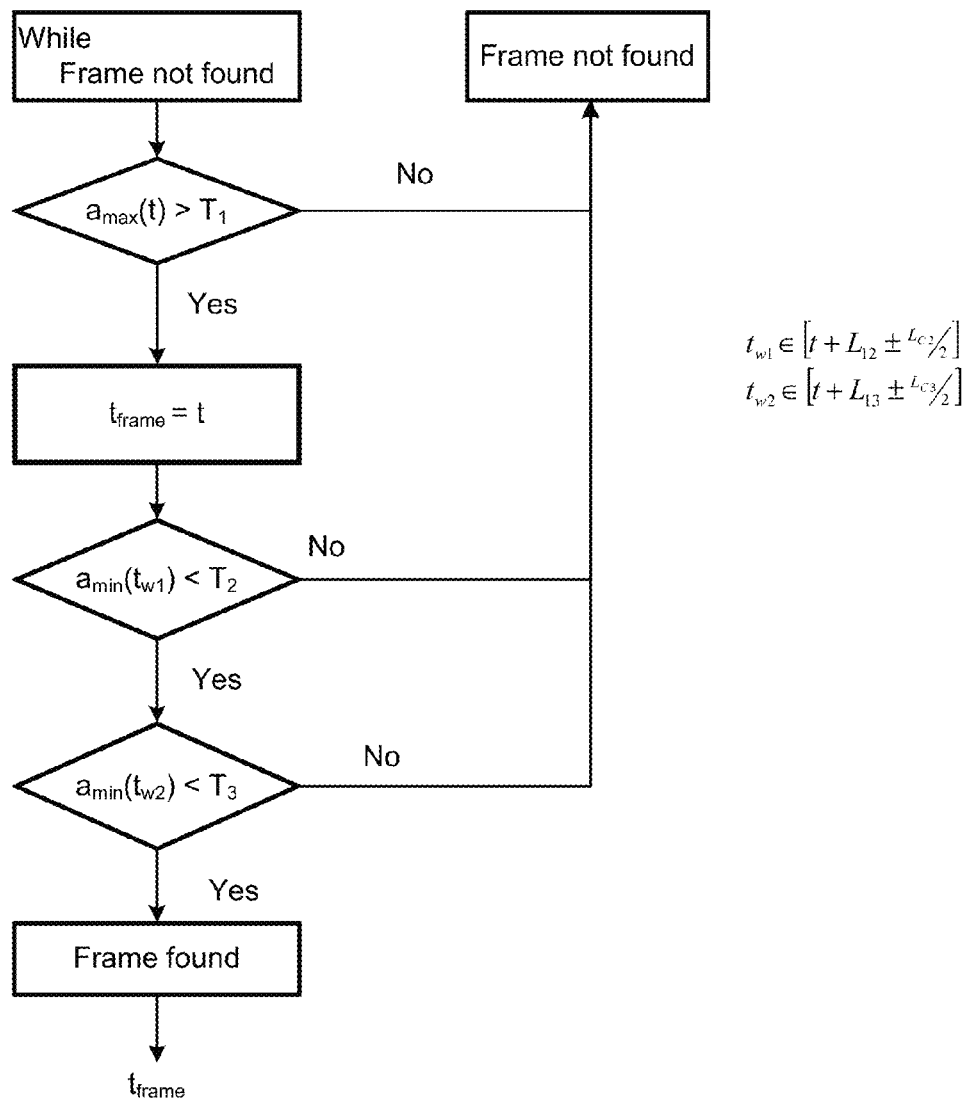
FIG. 7 is an example of the frame detection algorithm.

One example for the algorithm is provided in FIG. 7, where three criteria have to be met before $t_{frame}$ is declared:

1. a peak at t has to exceed the threshold, $T_1$;
2. a minimum within $t_{w1} \in [t + L_{12} \pm L_{C2}/2]$ has to be below the threshold, $T_2$; and
3. a minimum $t_{w2} \in [t + L_{13} \pm L_{C3}/2]$ within has to be below the threshold, $T_3$.

Figure 8:
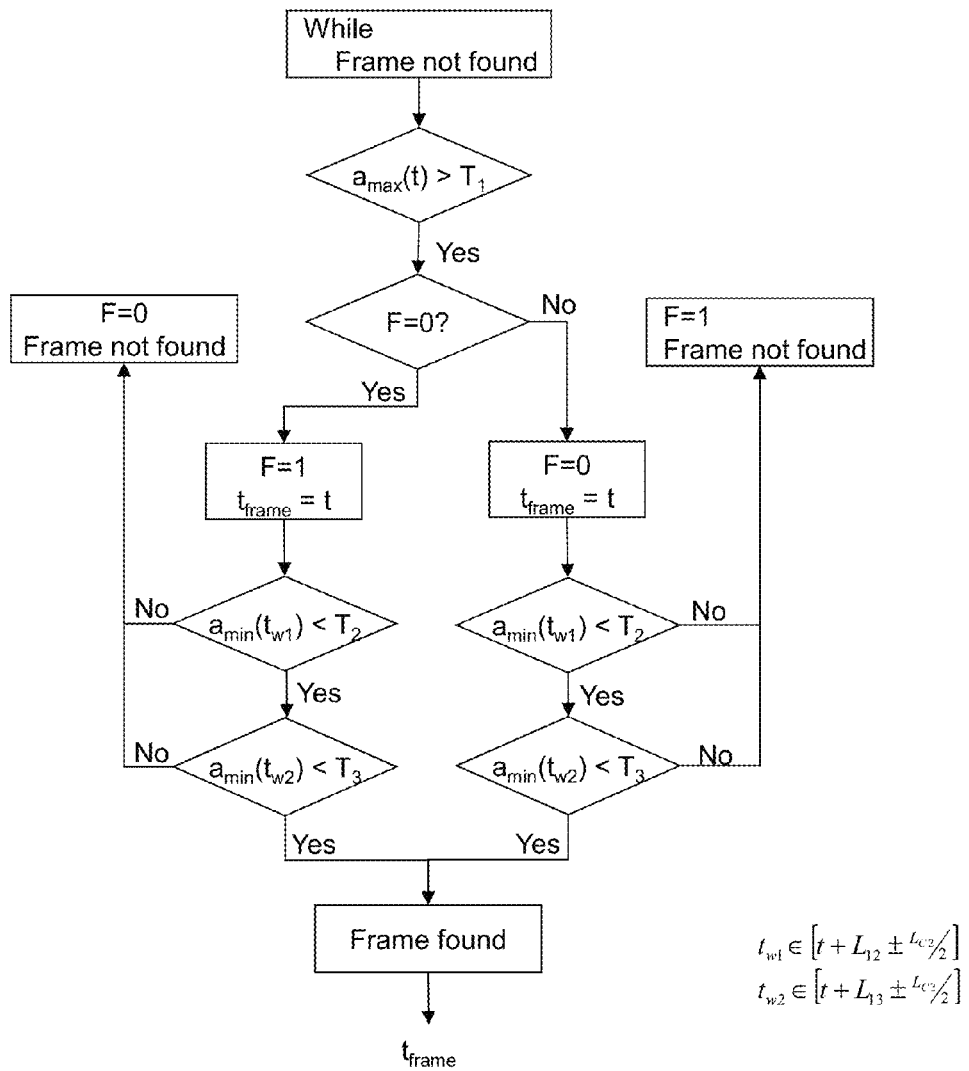
FIG. 8 is another example of the frame detection algorithm.

Additional detection logic can be added to increase the probability of detection and reduce the probabilities of missing and false alarms. For example, in the detection algorithm shown in FIG. 8, another set of criteria is added to increase the detection probability.

Frame Detection with Multiple Receivers

Figure 9:
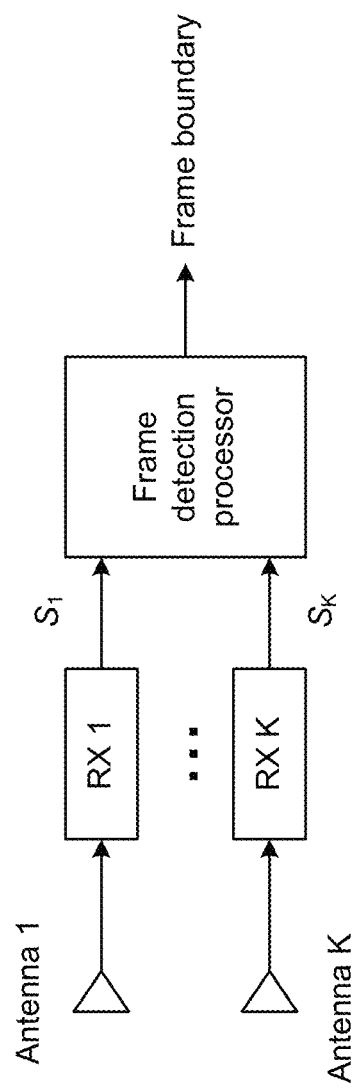
FIG. 9 is a block diagram of multiple receivers with a frame detection processor.

With multiple receivers, there are multiple signals available for frame synchronization, as shown in FIG. 9. The frame detection can be based on selection, combining, selection-combining, or joint detection.

Figure 10:
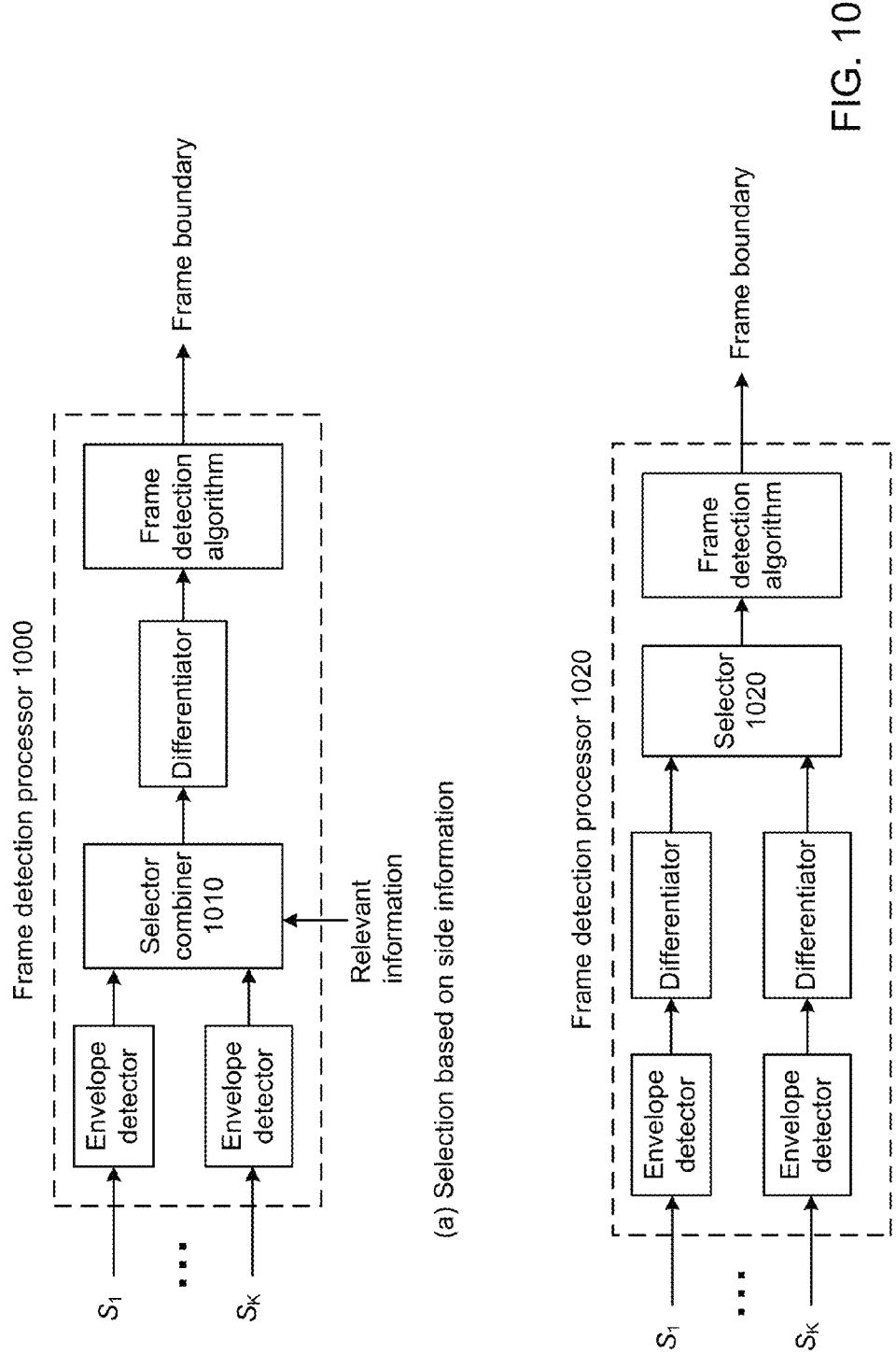
FIG. 10a is a block diagram for envelope selection based on side information and FIG. 10b is a block diagram for envelope selection based on the differential peaks.

In the selection approach, a frame detection processor 1000 or 1020 may select one among a plurality of envelopes for detection, as depicted in FIG. 10. The selection can be based on certain signal measures such as RSSI, average power, correlation coefficient, and/or SNR, which are input to a selector 1010 as side information (FIG. 10a). Selection can also be based on magnitudes of the peaks of the differential envelopes (FIG. 10b).

Figure 11:
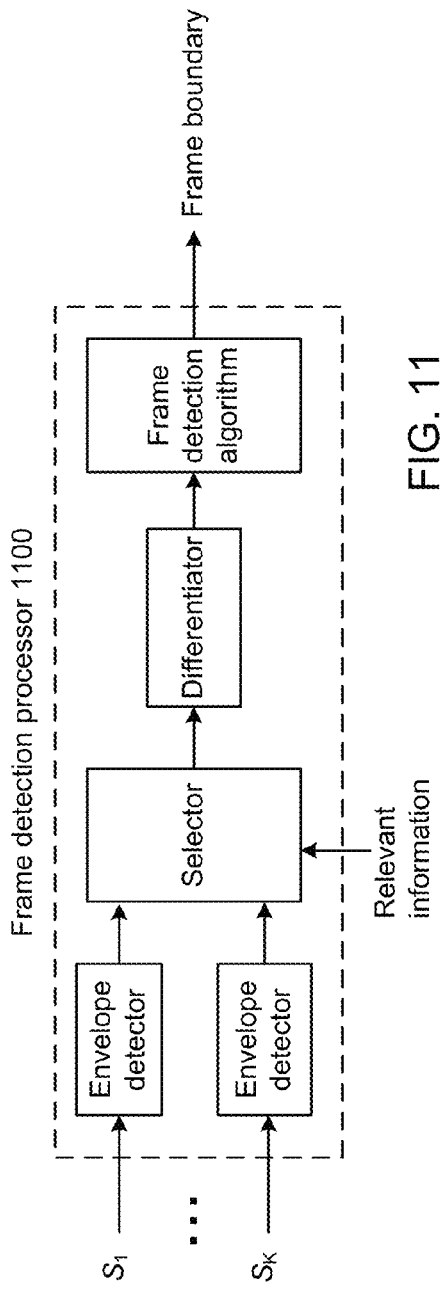
FIG. 11 is a block diagram for envelope combining

In the combining approach, a frame detection processor 1100 may combine the available envelopes for detection, as depicted in FIG. 11. The combining can be carried out simply by adding the available envelopes $\{A_k(n)\}_{k=1}^{K}$ together; that is, $$A(n) = \frac{1}{K}\sum_{k=1}^{K} A_k(n)$$

In a general case, the combining can be carried out by weighted average; that is, $$A(n) = \frac{1}{K}\sum_{k=1}^{K} w_k A_k(n)$$

where $w_k$ is the weight for the k-th envelope. The weights are related to certain signal measures such as RSSI, average power, temporal correlation coefficient, spatial correlation coefficient and/or SNR, which are input to the combiner as side information.

In the selection-combining approach, P signals are selected out of the K received signals based on certain criteria. The selected P signals are then combined using the above combining methods for frame synchronization.

Figure 12:
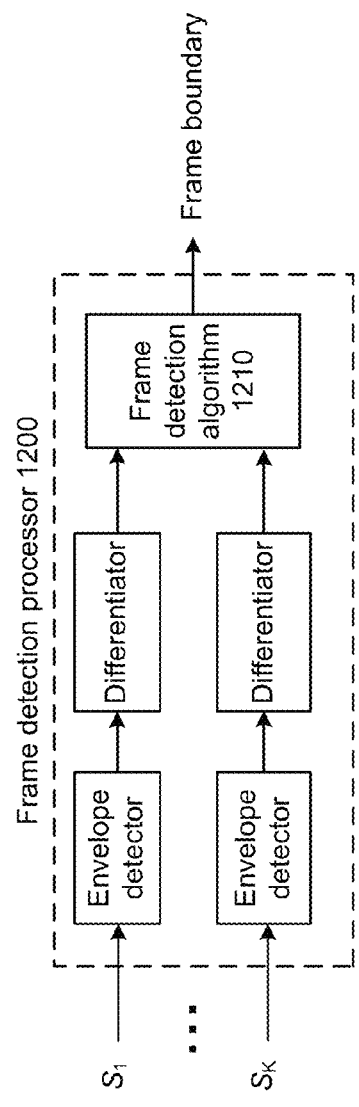
FIG. 12 is a block diagram for joint-detection.
Figure 13:
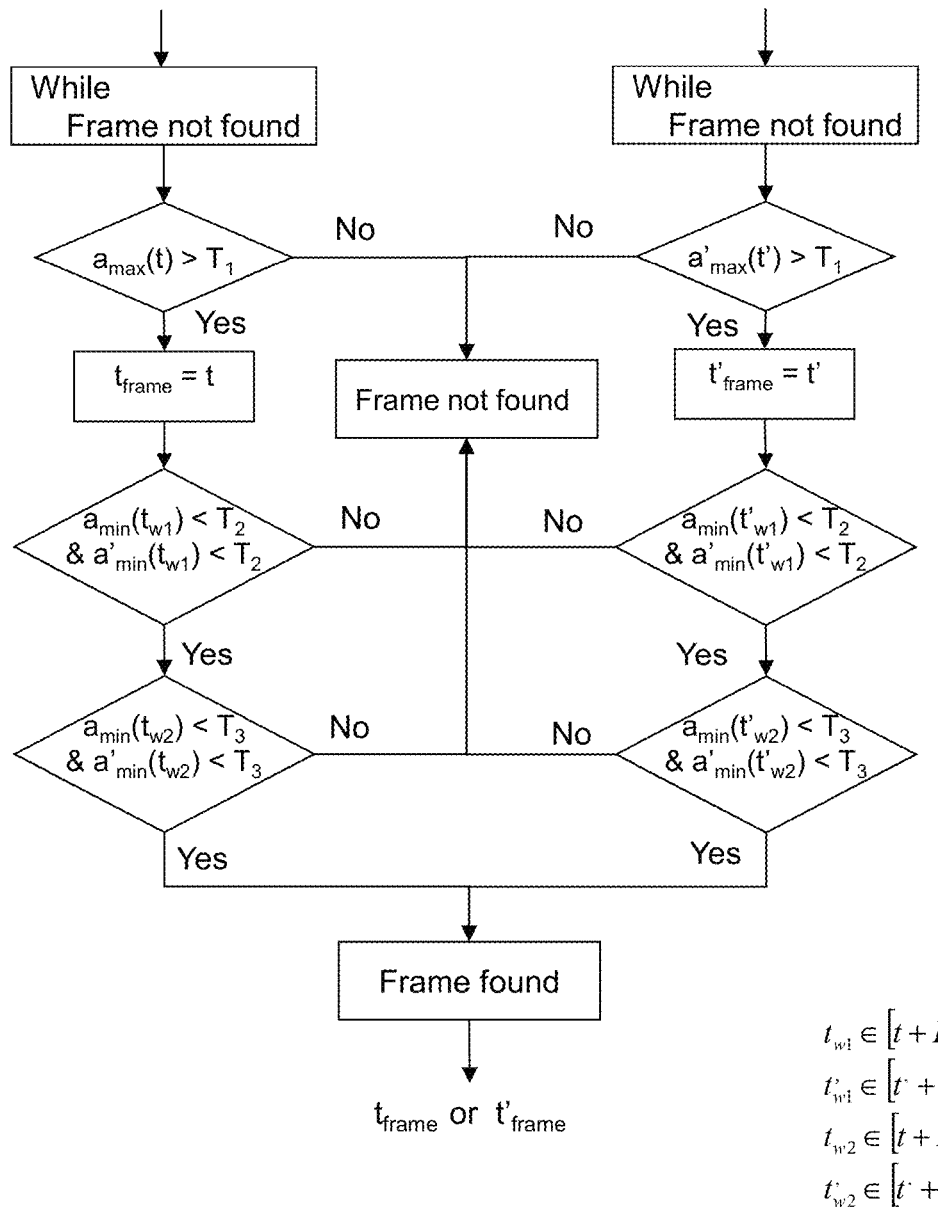
FIG. 13 is an example of joint-detection algorithm.

In the joint-detection approach, the frame detection processor 1200 may use the available envelopes for joint detection, as depicted in FIG. 12. In this case, a frame detection algorithm 1210 takes into account all of the detection cost functions to determine the frame starting time. One example for a joint-detection algorithm is provided in FIG. 13, where joint-criteria are applied to test both of the differential envelopes.

Code Detection

At the receiver, the detection of a code sequence embedded in a preamble signal or a ranging signal can be carried out in either the time domain or frequency domain. In the time domain method, the method may require one or more correlators to process the time-domain signals, depending on the processing configuration (e.g., time-multiplexing or parallel). In the frequency domain method, the signal is transformed to the frequency domain before being input to the code detection processor 1400, which comprises an array of code detectors 1410 and a comparator 1420, as shown in FIG. 14. Each code detector 1410 may include a sequence multiplier 1430, and inverse FFT (IFFT) 1440, and a peak detector 1450, as depicted in FIG. 15. The code-modulated subcarriers $\{S(n_l)\}_{l=1}^{L}$ in the received signal are multiplied by the code sequence of interest, $\{c(n_l)\}_{l=1}^{L}$, which is normally stored in the memory, and the resulting product is given by, $$r(n_l) = S(n_l) \cdot c(n_l) \text{ for } l=1, \ldots, L$$

where $$-\frac{L}{2} \leq n_l \leq \frac{L}{2} - 1$$

denotes the subcarrier index corresponding to code sequence element index l and N represents the length of the FFT. The resulting product $\{r(n_l)\}_{l=1}^{L}$ is transformed back to time-domain by the IFFT. A large peak will likely appear in the time-domain sequence if the transmitted code matches the code of interest. Such a peak will be detected by the peak detector. The possible peaks from different code detectors are compared by the comparator to determine which code-sequence is the most likely one transmitted by the transmitter.

Figure 16:
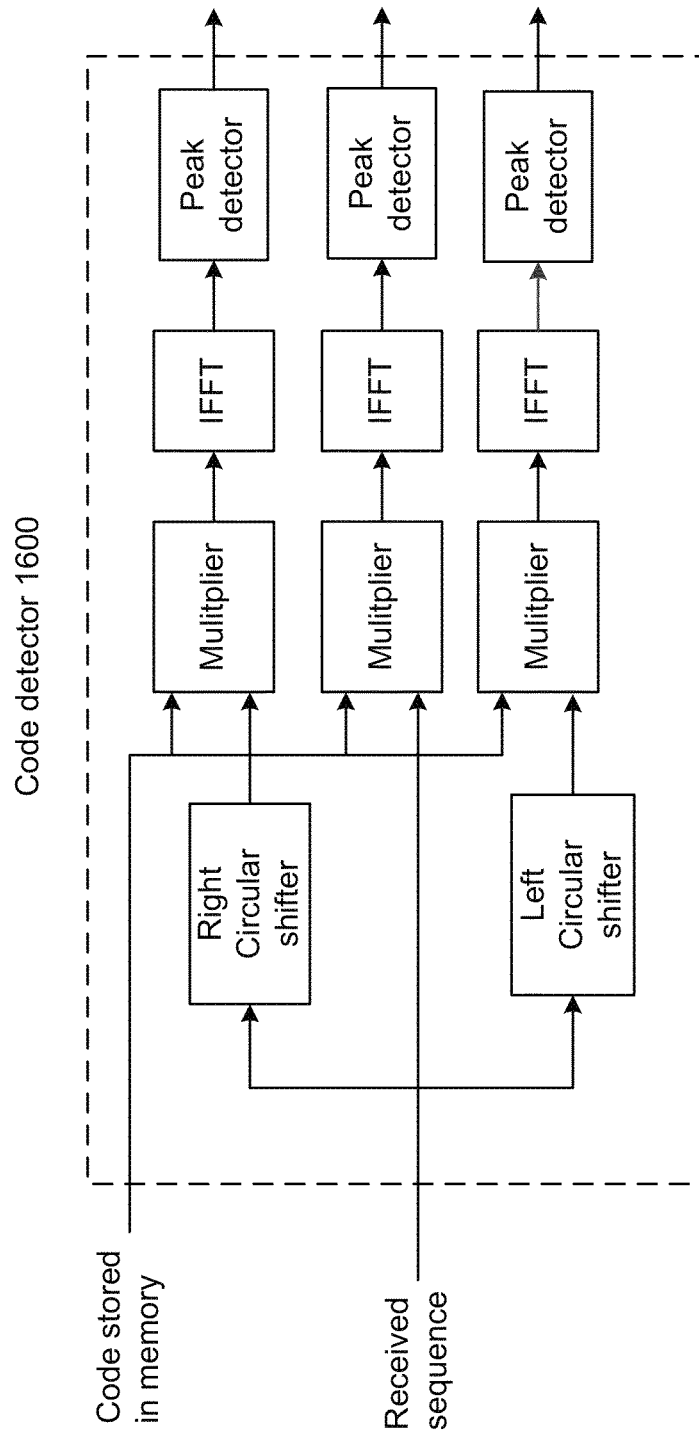
FIG. 16 is a block diagram of the code detector with circular shifters.

If the clock frequency at the receiver misaligns with the transmitter, the resulting frequency difference will degrade the detection ability at the receiver. If the misalignment is more than one half of the subcarrier spacing, the detection may fail. To mitigate this problem, the code detector may anticipate the frequency offset in searching for the code sequence. This may be accomplished by circularly shifting the received subcarriers $\{S(n_l)\}_{l=1}^{L}$ by one or more subcarrier spacing; that is, the shifted signal is given by $$S^m(n_l) = \begin{cases} S(n_l + m) & \text{if } n_l \leq \frac{L}{2} - m \\ S\left(\frac{L}{2} - n_l - m\right) & \text{if } n_l > \frac{L}{2} - m \end{cases}$$

where $m=\pm 1', \pm 2', \ldots$ denotes the number of spacing units to be shifted. FIG. 16 depicts a block diagram showing an example for the realization of a code detector 1600 with shifting. Alternatively, instead of shifting $\{S(n_l)\}_{l=1}^{L}$, one may choose to shift $\{c(n_l)\}_{l=1}^{L}$ in the same fashion, which will achieve the same objective. Thus, the resulting product is given by $$r^m(n_l) = S^m(n_l) \cdot c(n_l) \text{ for } l=1, \ldots, L \text{ and } m=0, \pm 1, \pm 2 \ldots$$

which will be transformed into the time domain for peak detection.

Code Detection with Multiple Receivers

With K receivers, there are K signals available for code detection. The code detection can be based on selection, combining, or the combination of the two.

Figure 17:
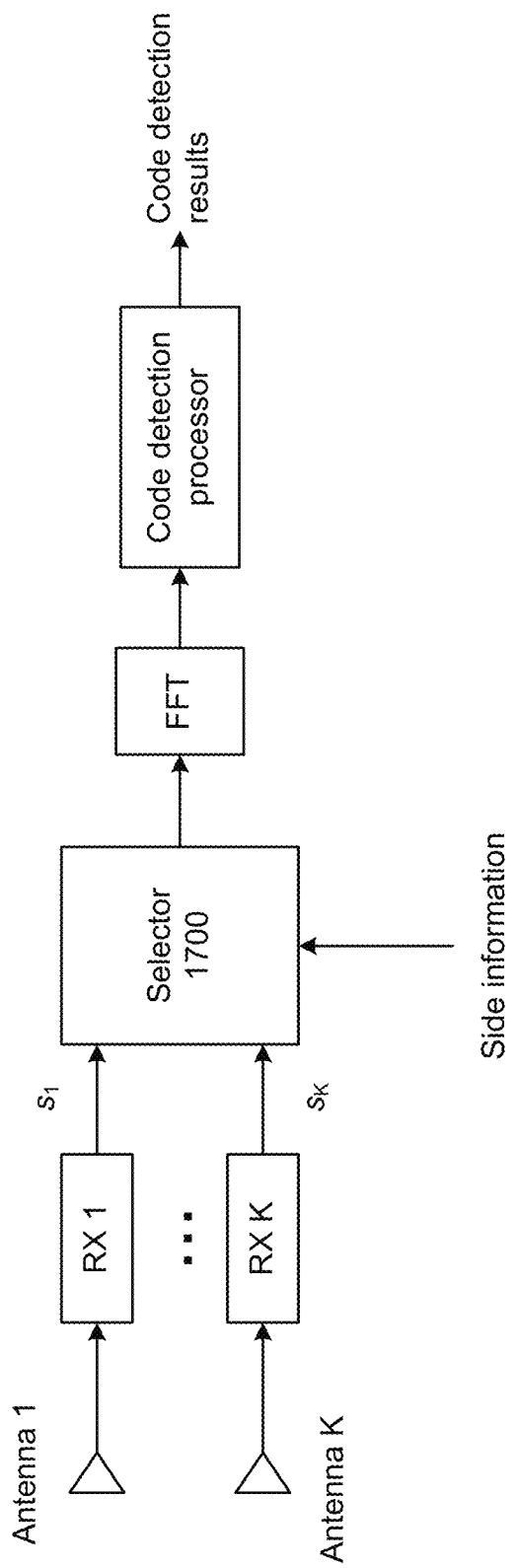
FIG. 17 is a block diagram of selection-based code detection with multiple receivers.

In the selection-based method, one of the K received signals $\{s_k\}_{k=1}^{K}$ in the time-domain may be chosen for code detection. The selection can be based on certain signal measures such as RSSI, average power, correlation coefficient, and/or signal-to-noise-ratio (SNR), which are input to a selector 1700 as side information (FIG. 17).

Figure 18:
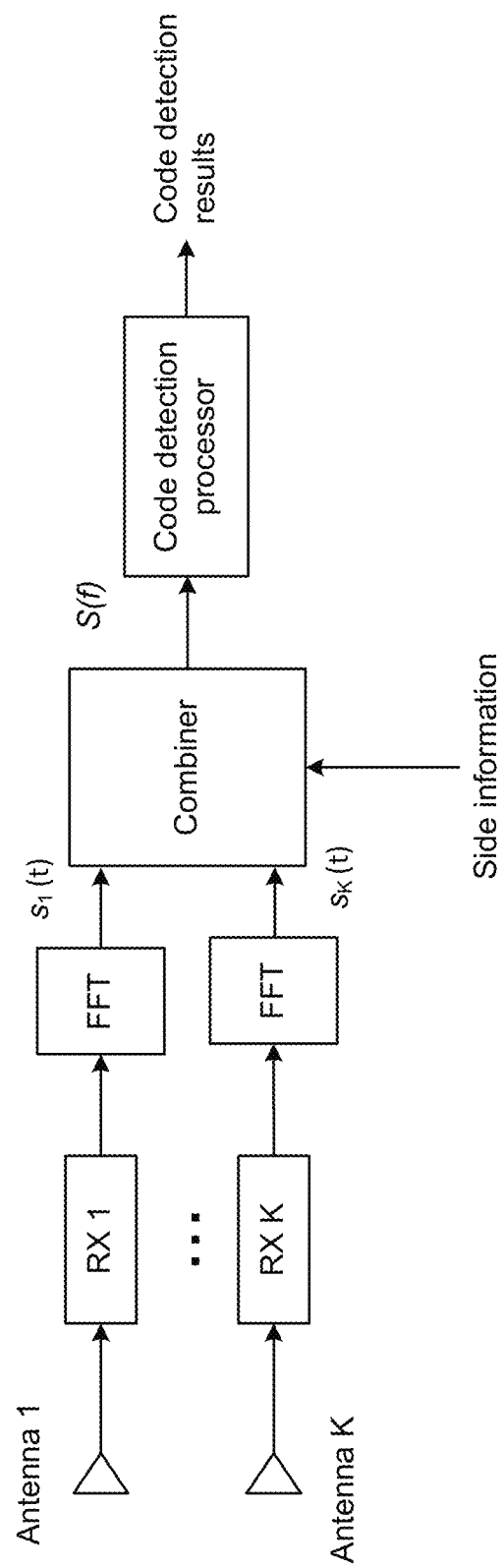
FIG. 18 is a block diagram of selection-based code detection with multiple receivers.

In the combining-based method, the K signals may be combined in the frequency domain for code detection, as shown in FIG. 18. Let $S_k(n_l) = A_k(n_l)e^{j\Phi_k(n_l)}$ be the $n_l$-th subcarrier of the k-th signal.

In some embodiments, the subcarriers from different receivers may be combined in amplitude and the phase of the combined signal takes on the phase value associated with the signal of the strongest signal measure; that is, the combined signal is expressed as $$S(n_l) = \left[\frac{1}{K}\sum_{k=1}^{K} A_k(n_l)\right] e^{j\phi_p(n_l)}$$

where $1 \leq p \leq K$ is the index of the received signal with the highest signal measure. The signal measure can be the average SNR or other signal characteristics.

In other embodiments, the subcarriers from different receivers may be combined in such a way that the combined signal is given by $$S(n_l) = \frac{1}{K}\sum_{k=1}^{K} S_k(n_l) e^{-j\varphi_k}$$

where $\phi_k$ denotes the reference phase for the k-th signal. The reference phase can be set to be the phase of a particular subcarrier, say the $n_0$-th subcarrier; that is, $$\phi_k = \phi_k(n_0)$$

Alternatively, the reference phase can be set to take on the value of the first-order $\bar{\phi}_k(n_l)$ approximation at a particular subcarrier, say the $n_0$-th subcarrier; that is, $$\phi_k = \bar{\phi}_k(n_0)$$

where the first-order approximation is given by $$\bar{\phi}_k = a_k + b_k n_l$$

and the coefficients $a_k$ and $b_k$ are determined by solving the following normal equations, $$a_k L + b_k \sum_{l=1}^{L} n_l = \sum_{l=1}^{L} \phi_k(n_l)$$

$$a_k \sum_{l=1}^{L} n_l + b_k \sum_{l=1}^{L} n_l^2 = \sum_{l=1}^{L} n_l \phi_k(n_l)$$

In some embodiments, the subcarriers from different receivers may be weighted first and then combined; that is, $$S(n_l) = \frac{1}{K} \sum_{k=1}^{K} S_k(n_l) \cdot w_k(n_l) e^{-j\varphi_k}$$

where $w_k(n_l)$ is the weight for the $n_l$-th subcarrier of the k-th signal. The weights may be related to certain signal measures such as RSSI, average power, temporal correlation coefficient, spatial correlation coefficient, and/or SNR, which are input to the combiner as side information.

In the selection-combining approach, P signals may be selected out of the K received signals based on certain criteria. The selected P signals are then combined using the above combining methods for code detection.

Frequency Offset Estimation

Figure 19:
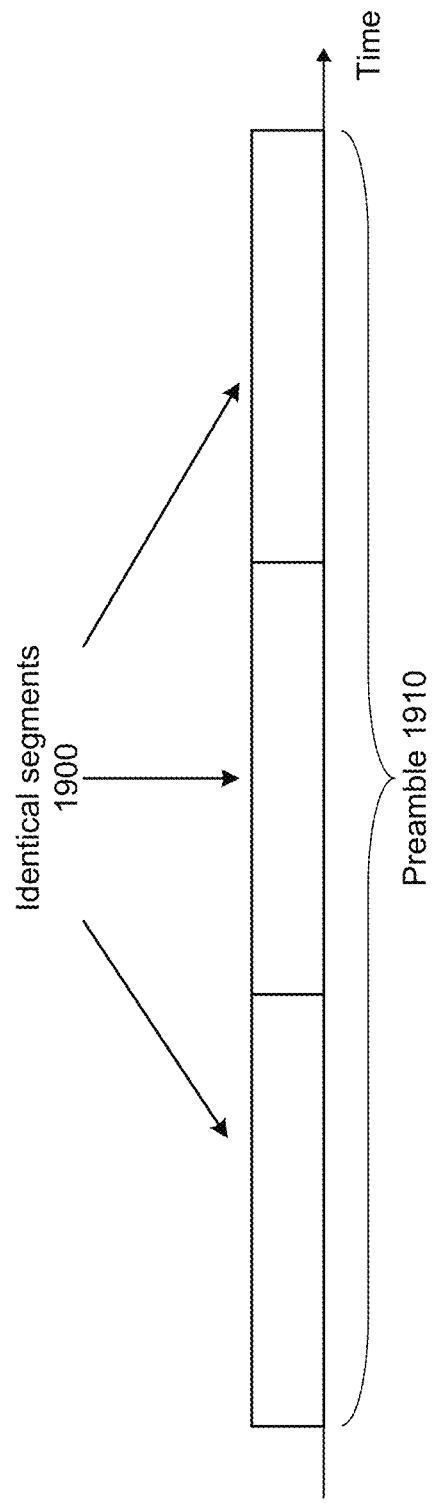
FIG. 19 is a graphical depiction of a multi-segment preamble in the time domain.

In some systems, a preamble 1910 may consists of multiple identical segments 1900, as shown in FIG. 19, to facilitate functions such as frequency offset estimation. Frequency-offset estimation may be carried out by first calculating the dot products of the identical segments in the preamble in the time domain. Let s(n) be the n-th time sample of preamble and N be the length for the identical segments. The dot product of the p-th segment and the q-th segment is given by $$D^{p,q} = \sum_{n=1}^{N} s(n) \cdot s^*[n + (q-p)N]$$

where q>p. The frequency offset is derived from the phase of the dot product; that is $$\Delta f = \frac{f_s}{2\pi(q-p)N} \arctan(D^{p,q})$$

The multiple identical segments in the preamble can all be used for the estimation to improve the estimation accuracy. For M segments in the preamble, the frequency offset is given by $$\Delta f = \frac{2}{(M-1)M} \frac{f_s}{2\pi N} \sum_{p=1}^{M} \sum_{q=p+1}^{M} \frac{\arctan(D^{p,q})}{(q-p)}$$

Frequency Offset Estimation with Multiple Receivers

In the case of K receivers which normally share one common frequency reference source, frequency-offset estimation may be carried out by weighted averaging the dot products of the preamble for each receiving path. Therefore, the frequency offset is given by $$\Delta f = \frac{f_s}{2\pi(q-p)N} \arctan\left(\sum_{k=1}^{K} w_k D_k^{p,q}\right)$$

where $w_k$ is the weight for the dot product at the k-th receiving path. The weights are related to certain signal measures such as RSSI, average power, temporal correlation coefficient, spatial correlation coefficient and/or SNR, which are input as side information. In an embodiment, the weight can be set equal to the amplitude of its corresponding dot product; that is, $$w_k = |D_k^{p,q}|$$

The multiple identical segments in the preamble can all be used for the estimation to further improve the estimation accuracy. For M segments in the preamble, the frequency offset is given by $$\Delta f = \frac{2}{(M-1)M} \frac{f_s}{2\pi N} \sum_{p=1}^{M} \sum_{q=p+1}^{M} \frac{\arctan\left(\sum_{k=1}^{K} w_k D_k^{p,q}\right)}{(q-p)}$$

Figure 20:
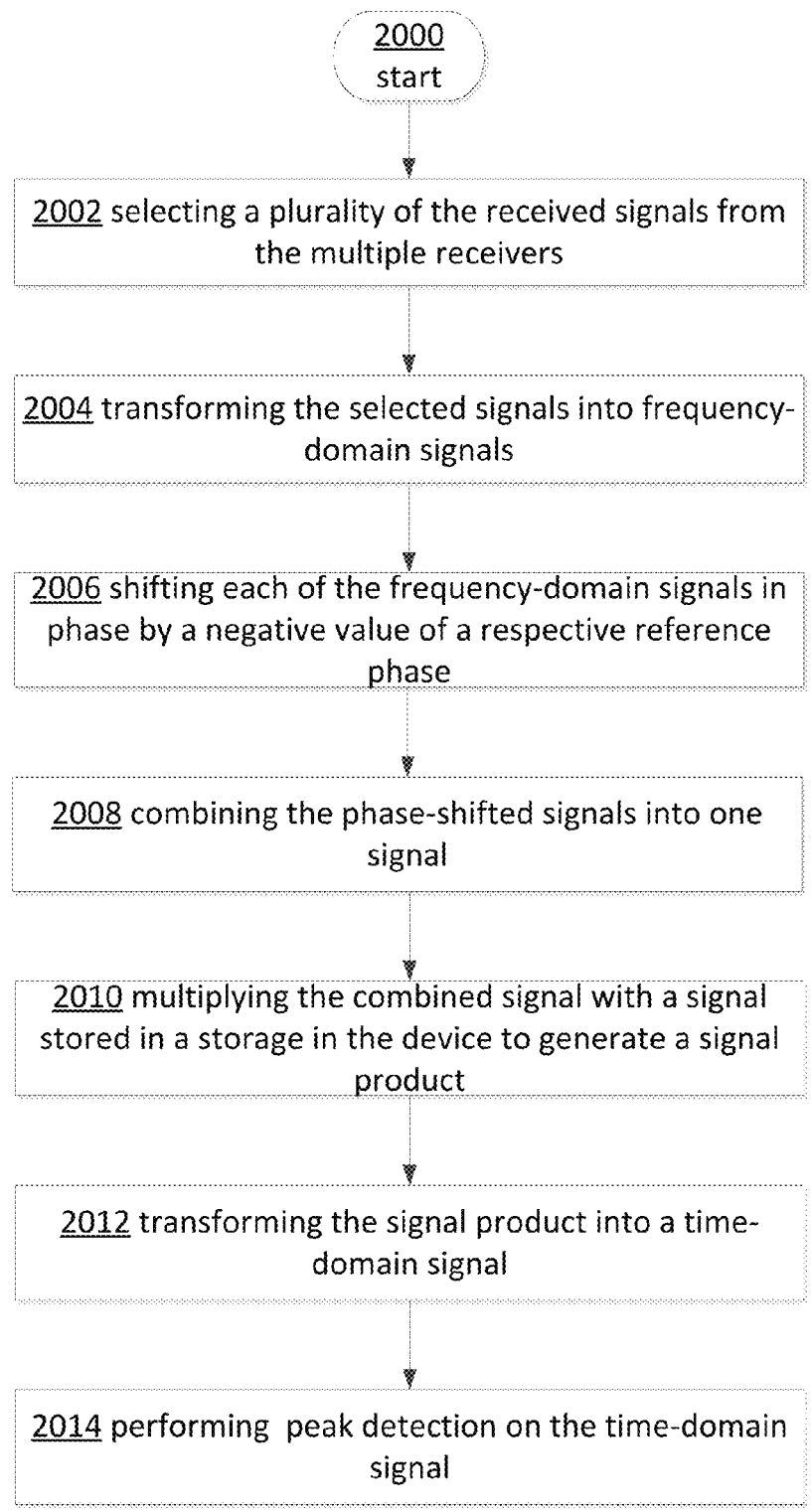
FIG. 20 illustrates an example of an operational procedure for practicing aspects of the present disclosure.

FIG. 20 depicts an exemplary operational procedure for signal detection including operations 2000, 2002, 2004, 2006, 2008, 2010, 2012, and 2014. In one embodiment, the procedure may be performed by a wireless device comprising multiple receivers, each receiver coupled to an antenna and configured to receive a signal from a same transmitting device via a propagation channel.

Referring to FIG. 20, operation 2000 begins the operational procedure and in operation 2002 a plurality of the received signals from the multiple receivers is selected. In operation 2004, the selected signals are transformed into frequency-domain signals. In operation 2006, each of the frequency-domain signals are shifted in phase by a negative value of a respective reference phase. In one embodiment, the respective reference phase is represented by $\phi$ and is set to a phase value at an $n_0$-th frequency subcarrier $\phi(n_0)$ of the signal to be phase-shifted. In another embodiment, the respective reference phase is represented by $\phi$ and is set to the value of a first-order phase approximation at an $n_0$-th frequency subcarrier $\bar{\phi}(n_0)$ of the signal to be phase-shifted, wherein the first-order phase approximation is given by $\bar{\phi}(n_l) = a + b n_l$, where $n_l$ represents the subcarrier index and coefficients a and b are determined by solving normal equations $$aL + b\sum_{l=1}^{L} n_l = \sum_{l=1}^{L} \phi(n_l)$$

$$a\sum_{l=1}^{L} n_l + b\sum_{l=1}^{L} n_l^2 = \sum_{l=1}^{L} n_l\phi(n_l)$$

where $\phi(n_l)$ represents the phase at the $n_l$-th frequency subcarrier of the signal to be phase-shifted and L is the length of the signal to be phase-shifted.

In some embodiments, each of the frequency-domain signals is weighted with a corresponding weight before being phase-shifted. In one embodiment, the corresponding weight is associated with a measure of the signal to be weighted, wherein the measure being a received signal strength indication (RSSI), a signal to noise ratio (SNR), an average power level, a temporal correlation coefficient, a spatial correlation coefficient, or a combination thereof.

In operation 2008, the phase-shifted signals are combined into one signal. In one embodiment, the phase-shifted signals may be combined into one signal using averaging. In operation 2010, the combined signal is multiplied with a signal stored in a storage in the device to generate a signal product. In one embodiment, the combined signal is represented by $\{S(n_l)\}_{l=1}^{L}$ and circularly shifted by one or more subcarrier spacings in accordance with $$S^m(n_l) = \begin{cases} S(n_l + m) & \text{if } n_l \leq \frac{L}{2} - m \\ S\left(\frac{L}{2} - n_l - m\right) & \text{if } n_l > \frac{L}{2} - m \end{cases}$$

In one embodiment, the stored signal is represented by $\{c(n_l)\}_{l=1}^{L}$ and circularly shifted by one or more subcarrier spacings in accordance with $$c^m(n_l) = \begin{cases} c(n_l + m) & \text{if } n_l \leq \frac{L}{2} - m \\ c\left(\frac{L}{2} - n_l - m\right) & \text{if } n_l > \frac{L}{2} - m \end{cases}$$

In operation 2012, the signal product is transformed into a time-domain signal. In operation 2014, peak detection is performed on the time-domain signal.

Figure 21:
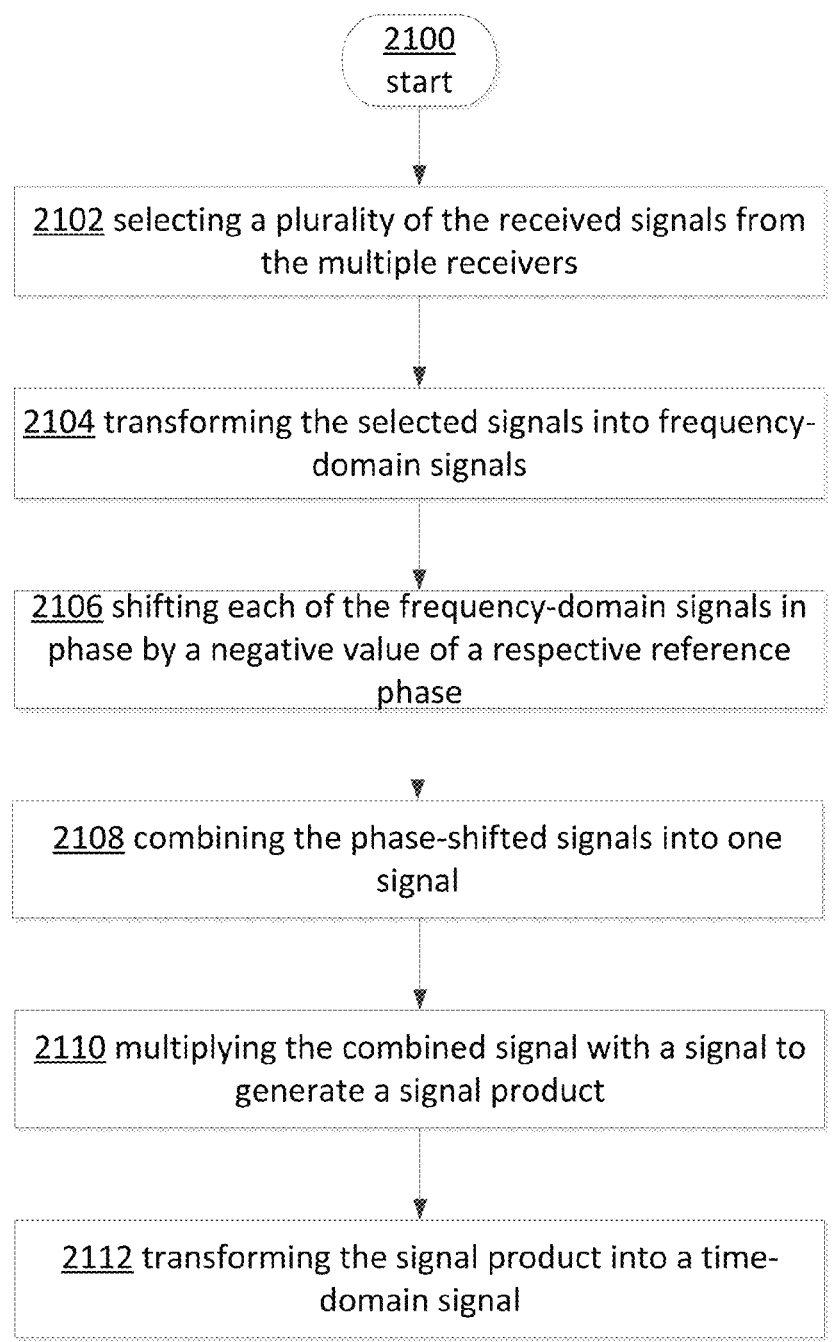
FIG. 21 illustrates an example of an operational procedure for practicing aspects of the present disclosure.

FIG. 21 depicts an exemplary operational procedure for signal processing including operations 2100, 2102, 2104, 2106, 2108, 2110, and 2112. In one embodiment, the procedure may be performed by a signal receiver configured to receive time-domain input.

Referring to FIG. 21, operation 2100 begins the operational procedure and in operation 2102 a plurality of the received signals from the multiple receivers is selected. In operation 2104, the selected signals are transformed into frequency-domain signals. In operation 2106, each of the frequency-domain signals are shifted in phase by a negative value of a respective reference phase.

In some embodiments, each of the frequency-domain signals is weighted with a corresponding weight before being phase-shifted. In one embodiment, the corresponding weight is associated with a measure of the signal to be weighted, wherein the measure being a received signal strength indication (RSSI), a signal to noise ratio (SNR), an average power level, a temporal correlation coefficient, a spatial correlation coefficient, or a combination thereof.

In operation 2108, the phase-shifted signals are combined into one signal. In one embodiment, the phase-shifted signals may be combined into one signal using averaging. In operation 2110, the combined signal is multiplied with a signal. In operation 2112, the signal product is transformed into a time-domain signal.

Any of the above mentioned aspects can be implemented in methods, systems, computer readable media, or any type of manufacture. For example, a computer readable medium can store thereon computer executable instructions for signal detection and signal processing.

Lastly, while the present disclosure has been described in connection with the preferred aspects, as illustrated in the various figures, it is understood that other similar aspects may be used or modifications and additions may be made to the described aspects for performing the same function of the present disclosure without deviating there from. For example, in various aspects of the disclosure, methods and systems for communicating in a wireless communications system were disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A signal detection method by a wireless device comprising multiple receivers, each receiver coupled to an antenna and configured to receive a signal from a same transmitting device via a propagation channel, the method comprising:
    selecting a plurality of the received signals from said multiple receivers;
    transforming the selected signals into frequency-domain signals;
    shifting each of the frequency-domain signals in phase by a negative value of a respective reference phase;
    combining the phase-shifted signals into one signal, wherein the combined signal is represented by $\{S(n_l)\}_{l=1}^{L}$;
    circularly shifting the combined signal by m subcarrier spacings in accordance with $$S^m(n_l) = \begin{cases} S(n_l + m) & \text{if } n_l \leq \frac{L}{2} - m \\ S\left(\frac{L}{2} - n_l - m\right) & \text{if } n_l > \frac{L}{2} - m, \end{cases}$$

wherein m is an integer;
    multiplying the circularly shifted signal with a signal stored in a storage in the device to generate a signal product;
    transforming the signal product into a time-domain signal; and
    performing peak detection on the time-domain signal.

2. The method of claim 1, wherein the respective reference phase is represented by $\phi$ and is set to a phase value at an $n_0$-th frequency subcarrier $\phi(n_0)$ of the signal to be phase-shifted.

3. The method of claim 1, wherein the respective reference phase is represented by $\phi$ and is set to the value of a first-order phase approximation at an $n_0$-th frequency subcarrier $\bar{\phi}(n_0)$ of the signal to be phase-shifted, wherein the first-order phase approximation is given by $\bar{\phi}(n_l) = a + bn_l$, where $n_l$ represents the subcarrier index and coefficients a and b are determined by solving normal equations $$aL + b\sum_{l=1}^{L} n_l = \sum_{l=1}^{L} \phi(n_l)$$

$$a\sum_{l=1}^{L} n_l + b\sum_{l=1}^{L} n_l^2 = \sum_{l=1}^{L} n_l \phi(n_l)$$

where $\phi(n_l)$ represents the phase at the $n_l$-th frequency subcarrier of the signal to be phase-shifted and L is the length of the signal to be phase-shifted.

4. The method of claim 1, wherein each of the frequency-domain signals is weighted with a corresponding weight before being phase-shifted.

5. The method of claim 4, wherein the corresponding weight is associated with a measure of the signal to be weighted, wherein the measure is
a received signal strength indication (RSSI);
a signal to noise ratio (SNR);
an average power level;
a temporal correlation coefficient;
a spatial correlation coefficient;
or a combination thereof.

6. A signal detector in a wireless device comprising multiple receivers, each receiver coupled to an antenna and configured to receive a signal from a same transmitting device via a propagation channel, the detector comprising:
means for selecting a plurality of received signals from said multiple receivers;
means for transforming the selected signals into frequency-domain signals;
means for shifting each of the frequency-domain signals in phase by a negative value of a respective reference phase;
means for combining the phase-shifted signals into one signal, wherein the combined signal is represented by $\{S(n_l)\}_{l=1}^{L}$;
means for circularly shifting the combined signal by m subcarrier spacings in accordance with $$S^m(n_l) = \begin{cases} S(n_l + m) & \text{if } n_l \le \frac{L}{2} - m \\ S\left(\frac{L}{2} - n_l - m\right) & \text{if } n_l > \frac{L}{2} - m, \end{cases}$$

wherein m is an integer;
means for multiplying the circularly shifted signal with a signal stored in a storage in the device;
means for transforming the signal product into a time-domain signal; and
means for performing a peak detection on the time-domain signal.

7. A non-transitory computer readable storage medium storing thereon computer executable instructions for signal detection by a wireless device comprising multiple receivers, each receiver coupled to an antenna and configured to receive a signal from a same transmitting device via a propagation channel, the computer readable storage medium comprising:
instructions for selecting a plurality of received signals from said multiple receivers;
instructions for transforming the selected signals into frequency-domain signals;
instructions for shifting each of the frequency-domain signals in phase by a negative value of a respective reference phase;
instructions for combining the phase-shifted signals into one signal, wherein the combined signal is represented by $\{S(n_l)\}_{l=1}^{L}$;
instructions for circularly shifting the combined signal by m subcarrier spacings in accordance with $$S^m(n_l) = \begin{cases} S(n_l + m) & \text{if } n_l \le \frac{L}{2} - m \\ S\left(\frac{L}{2} - n_l - m\right) & \text{if } n_l > \frac{L}{2} - m, \end{cases}$$

wherein m is an integer;
instructions for multiplying the circularly shifted signal with a signal stored in a storage in the device;
instructions for transforming the signal product into a time-domain signal; and
instructions for performing a peak detection on the time-domain signal.

8. A mobile device comprising multiple receivers, each receiver coupled to an antenna and configured to receive a signal from a same transmitting device via a propagation channel, the mobile device configured to:
select a plurality of the received signals from said multiple receivers;
transform the selected signals into frequency-domain signals;
shift each of the frequency-domain signals in phase by a negative value of a respective reference phase;
combine the phase-shifted signals into one signal, wherein the combined signal is represented by $\{S(n_l)\}_{l=1}^{L}$;
circularly shift the combined signal by m subcarrier spacings in accordance with $$S^m(n_l) = \begin{cases} S(n_l + m) & \text{if } n_l \le \frac{L}{2} - m \\ S\left(\frac{L}{2} - n_l - m\right) & \text{if } n_l > \frac{L}{2} - m, \end{cases}$$

wherein m is an integer;
multiply the circularly shifted signal with a signal stored in a storage in the device to generate a signal product;
transform the signal product into a time-domain signal; and
perform peak detection on the time-domain signal.

9. The mobile device of claim 8, wherein the respective reference phase is represented by $\phi$ and is set to a phase value at an $n_0$-th frequency subcarrier $\phi(n_0)$ of the signal to be phase-shifted.

10. The mobile device of claim 8, wherein the respective reference phase is represented by $\phi$ and is set to the value of a first-order phase approximation at an $n_0$-th frequency subcarrier $\bar{\phi}(n_0)$ of the signal to be phase-shifted, wherein the first-order phase approximation is given by $\bar{\phi}(n_l) = a + bn_l$, where $n_l$ represents the subcarrier index and coefficients a and b are determined by solving normal equations $$aL + b\sum_{l=1}^{L} n_l = \sum_{l=1}^{L} \phi(n_l)$$

$$a\sum_{l=1}^{L} n_l + b\sum_{l=1}^{L} n_l^2 = \sum_{l=1}^{L} n_l \phi(n_l)$$

where $\phi(n_l)$ represents the phase at the $n_l$-th frequency subcarrier of the signal to be phase-shifted and L is the length of the signal to be phase-shifted.

11. The mobile device of claim 8, wherein each of the frequency-domain signals is weighted with a corresponding weight before being phase-shifted.

12. The mobile device of claim 11, wherein the corresponding weight is associated with a measure of the signal to be weighted, wherein the measure is
   a received signal strength indication (RSSI);
   a signal to noise ratio (SNR);
   an average power level;
   a temporal correlation coefficient;
   a spatial correlation coefficient;
   or a combination thereof.

13. A signal processing method by a signal receiver configured to receive multiple time-domain input signals, the method comprising:
   receiving multiple time-domain input signals by said signal receiver;
   selecting a plurality of the input signals among the multiple time-domain input signals;
   transforming the selected signals into frequency-domain signals;
   shifting each of the frequency-domain signals in phase by a negative value of a respective reference phase;
   combining the phase-shifted signals into one signal;
   multiplying the combined signal with a reference signal to generate a signal product, wherein the reference signal is represented by $\{c(n_l)\}_{l=1}^{L}$ and circularly shifted by one or more subcarrier spacings in accordance with $$c^m(n_l) = \begin{cases} c(n_l + m) & \text{if } n_l \leq \frac{L}{2} - m \\ c\left(\frac{L}{2} - n_l - m\right) & \text{if } n_l > \frac{L}{2} - m, \end{cases}$$

wherein m is an integer; and
   transforming the signal product into a time-domain signal.

14. The method of claim 13, wherein each of the frequency-domain signals is weighted with a corresponding weight before being phase-shifted.

15. The method of claim 14, wherein the corresponding weight is associated with a measure of the signal to be weighted, wherein the measure is
   a received signal strength indication (RSSI);
   a signal to noise ratio (SNR);
   an average power level;
   a temporal correlation coefficient;
   a spatial correlation coefficient;
   or a combination thereof.

16. A mobile device comprising a signal receiver configured to receive multiple time-domain input signals, the mobile device configured to:
   receiving multiple time-domain input signals by said signal receiver;
   select a plurality of the input signals among the multiple time-domain input signals;
   transform the selected signals into frequency-domain signals;
   shift each of the frequency-domain signals in phase by a negative value of a respective reference phase;
   combine the phase-shifted signals into one signal;
   multiply the combined signal with a reference signal to generate a signal product wherein the reference signal is represented by $\{c(n_l)\}_{l=1}^{L}$ and circularly shifted by one or more subcarrier spacings in accordance with $$c^m(n_l) = \begin{cases} c(n_l + m) & \text{if } n_l \leq \frac{L}{2} - m \\ c\left(\frac{L}{2} - n_l - m\right) & \text{if } n_l > \frac{L}{2} - m, \end{cases}$$

wherein m is an integer; and
   transform the signal product into a time-domain signal.

* * * * *